United States Patent
Kabler et al.

(10) Patent No.: US 8,842,004 B2
(45) Date of Patent: *Sep. 23, 2014

(54) ANALYZING DATA FROM NETWORKED RADAR DETECTORS

(75) Inventors: Ronald Byron Kabler, Lawrence, KS (US); Robert Ryan Brandys, Hinsdale, IL (US); Monica Marie Vondruska, Golden, CO (US)

(73) Assignee: Cobra Electronics Corporation, Chicago, IL (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/514,232

(22) PCT Filed: Dec. 6, 2010

(86) PCT No.: PCT/US2010/059115
§ 371 (c)(1),
(2), (4) Date: Aug. 9, 2012

(87) PCT Pub. No.: WO2011/071826
PCT Pub. Date: Jun. 16, 2011

(65) Prior Publication Data
US 2012/0326889 A1 Dec. 27, 2012

Related U.S. Application Data

(60) Provisional application No. 61/267,172, filed on Dec. 7, 2009.

(51) Int. Cl.
*G08B 1/08* (2006.01)
*B28C 5/42* (2006.01)

(52) U.S. Cl.
USPC ............ 340/539.13; 340/539.11; 340/539.17; 701/32.3

(58) Field of Classification Search
USPC ......... 340/901, 902, 905, 907, 933, 436, 438, 340/439, 539.11, 539.13, 4.32, 539.17; 366/61, 349; 701/29, 32.3, 35, 93, 409; 420/13, 20, 27, 32.3, 104, 482; 455/404.2
See application file for complete search history.

(56) References Cited

U.S. PATENT DOCUMENTS 3,956,626 A 5/1976 Ross
5,021,961 A 6/1991 Ross
(Continued)

FOREIGN PATENT DOCUMENTS

| WO | WO2008137996 A1 | 11/2008 |
| WO | WO2011071826 A1 | 6/2011 |
| WO | WO2011087714 A1 | 7/2011 |

OTHER PUBLICATIONS

Mumble Webpage, http://mumble.sourceforge.net, printed on Oct. 15, 2013.

(Continued)

*Primary Examiner* — Van T. Trieu
(74) *Attorney, Agent, or Firm* — Hitchcock Evert LLP

(57) ABSTRACT

A radar detector accesses a network interface module that enables communication of data to and from a server. The server executes analysis algorithms that analyze data received from multiple radar detectors to develop predictions about the likelihood of future alerts or threats in geographic locations. The server communicates the predictions to each of the radar detectors based on the geographic locations corresponding to each of the radar detectors. Each radar detector communicates alert levels as needed to its corresponding radar detector user based on predictions that correspond to the geographic locations corresponding to each of the radar detectors.

59 Claims, 3 Drawing Sheets

(56) References Cited

U.S. PATENT DOCUMENTS

| | | |
|---|---|---|
| 5,151,701 A | 9/1992 | Valentine |
| 5,206,651 A | 4/1993 | Valentine et al. |
| 5,218,467 A | 6/1993 | Ross |
| 5,229,947 A | 7/1993 | Ross |
| 5,250,951 A | 10/1993 | Valentine |
| D366,659 S | 1/1996 | Ross |
| 5,510,793 A | 4/1996 | Gregg, III |
| 5,515,402 A | 5/1996 | Chester |
| 5,784,021 A | 7/1998 | Oliva |
| 5,815,092 A | 9/1998 | Gregg, III |
| 5,859,628 A | 1/1999 | Ross |
| 5,943,653 A | 8/1999 | Ross |
| 5,977,884 A | 11/1999 | Ross |
| 6,118,403 A | 9/2000 | Lang |
| 6,201,493 B1 | 3/2001 | Silverman |
| 6,204,798 B1 | 3/2001 | Fleming |
| 6,265,989 B1 | 7/2001 | Taylor |
| 6,266,617 B1 | 7/2001 | Evans |
| 6,384,776 B1 | 5/2002 | Martin |
| 6,400,304 B1 | 6/2002 | Chubbs, III |
| 6,442,485 B2 | 8/2002 | Evans |
| 6,469,653 B1 | 10/2002 | Haynes |
| 6,480,144 B1 | 11/2002 | Miller et al. |
| 6,498,569 B2 | 12/2002 | Dijkstra |
| 6,567,035 B1 | 5/2003 | Elliott |
| 6,670,905 B1 | 12/2003 | Orr |
| 6,675,085 B2 | 1/2004 | Straub |
| 6,748,322 B1 | 6/2004 | Fernandez |
| 6,845,317 B2 | 1/2005 | Craine |
| 6,895,324 B2 | 5/2005 | Straub |
| 6,943,723 B2 | 9/2005 | Kim |
| 6,980,092 B2 | 12/2005 | Turnbull et al. |
| RE39,038 E | 3/2006 | Fleming, III |
| 7,042,345 B2 * | 5/2006 | Ellis ........................ 340/436 |
| 7,171,187 B2 * | 1/2007 | Haave et al. .............. 455/404.2 |
| 7,183,942 B2 | 2/2007 | Rock |
| 7,301,494 B2 | 11/2007 | Waters |
| 7,468,659 B2 * | 12/2008 | Haave et al. ............ 340/539.13 |
| 7,471,236 B1 | 12/2008 | Pitt |
| 7,489,993 B2 * | 2/2009 | Coffee et al. ............... 701/32.3 |
| RE40,653 E | 3/2009 | Fleming, III |
| 7,702,044 B2 | 4/2010 | Nallapureddy et al. |
| 7,764,219 B2 | 7/2010 | Pitt |
| RE41,905 E | 11/2010 | Fleming, III |
| 7,899,450 B2 | 3/2011 | Pitt |
| 7,965,222 B2 | 6/2011 | Pitt |
| 7,999,721 B2 | 8/2011 | Orr |
| 8,255,155 B1 | 8/2012 | Crane et al. |
| 8,373,588 B2 | 2/2013 | Kuhn |
| 8,515,414 B2 | 8/2013 | Pitt et al. |
| 8,525,723 B2 | 9/2013 | Orr et al. |
| 2001/0030624 A1 | 10/2001 | Schwoegler |
| 2002/0135504 A1 | 9/2002 | Singer |
| 2002/0152264 A1 | 10/2002 | Yamasaki |
| 2003/0052797 A1 | 3/2003 | Rock |
| 2003/0139150 A1 | 7/2003 | Rodriguez |
| 2003/0214430 A1 | 11/2003 | Husted |
| 2003/0218562 A1 | 11/2003 | Orr |
| 2004/0107037 A1 | 6/2004 | Straub |
| 2004/0254729 A1 | 12/2004 | Browne |
| 2005/0242984 A1 | 11/2005 | Waters |
| 2007/0046531 A1 | 3/2007 | Yu |
| 2007/0109187 A1 | 5/2007 | Murphy |
| 2007/0216521 A1 | 9/2007 | Guensler et al. |
| 2007/0222639 A1 | 9/2007 | Giles |
| 2009/0016418 A1 | 1/2009 | Silver |
| 2010/0188265 A1 | 7/2010 | Hill et al. |
| 2010/0214148 A1 | 8/2010 | Kuhn |
| 2010/0214149 A1 | 8/2010 | Kuhn |
| 2010/0242906 A1 * | 9/2010 | Konezny .................. 123/339.14 |
| 2010/0317420 A1 | 12/2010 | Hoffberg |
| 2011/0149933 A1 | 6/2011 | Pitt |
| 2012/0268306 A1 | 10/2012 | Coburn |
| 2013/0009760 A1 | 1/2013 | Washlow |
| 2013/0207829 A1 | 8/2013 | Kabler |
| 2013/0211707 A1 | 8/2013 | Washlow |
| 2013/0214939 A1 | 8/2013 | Washlow |

OTHER PUBLICATIONS

Blog Entry "Radar detector interface to iPhone," by Beamerboy on Tuesday, Aug. 25, 2009, www.trapster.com, printed on Nov. 5, 2009.
Radar Active Website, May 15, 2010, www.radaractive.com, as saved by Web.archive.org, printed on Jan. 21, 2013.
"Ford Prototype Car Talks to Other Cars," Jan. 26, 2011, www.ceoutlook.com, as printed on Feb. 3, 2011.
"Ford's intelligent vehicles communicate wirelessly, shoot hula hoops out of tailpipes (video)," Jan. 27, 2011, www.engadget.com, as printed on Jan. 21, 2013.

* cited by examiner

ANALYZING DATA FROM NETWORKED RADAR DETECTORS

CROSS-REFERENCE TO RELATED APPLICATION

This application claims the benefit of priority from U.S. Provisional Application No. 61/267,172 filed on Dec. 7, 2009.

FIELD OF THE INVENTION

This invention relates generally to the field of sensing equipment meant to alert motor vehicle operators and passengers to potential threats and safety risks such as law enforcement speed monitoring activity, the presence of emergency vehicles, traffic hazard warning devices, and other warnings or hazards. This invention further relates to the field of threat level topography, in which sensing equipment alerts motor vehicle operators to levels of threats that are predicted for specific geographic locations. This invention also relates generally to the "cloud computing" model of data exchange and storage and the "crowd-sourcing" method of data aggregation to enhance sensing equipment meant to alert motor vehicle operators and passengers to potential threats and safety risks.

BACKGROUND

Conventional radar detectors detect electromagnetic signals (such as microwave signals) or laser signals transmitted from radar or laser-type speed measurement equipment, such as police radar signals. Thus, radar detectors serve to provide advance warning to drivers who are being monitored by police radar. However, radar detectors and their scanning algorithms are an imperfect technology. Electromagnetic waves are naturally vulnerable to reflection, bouncing, and scattering. These characteristics create variability and "noise" that a radar detector must detect and analyze before determining whether or not to alert a motor vehicle operator to a potential threat. In addition, radar detectors do not actively predict areas for alert and, instead, they react to signals they receive from the environment which limits the amount of advanced warning that can be provided.

Those skilled in the art will recognize that for many years there have been a number of tools and/or types of sensing equipment used by drivers to provide an alert to these sorts of traffic control devices, with radar/laser detectors the most common. As used herein, the terms radar detector and electromagnetic signal detector will be used interchangeably to refer to any of a number of known speed detection units capable of detecting electromagnetic waves on the X-band, K-band or Ka-band. Furthermore, the terms radar detector and electromagnetic signal detector will also be used interchangeably to refer to speed detection units known as laser detectors, and could refer to any electromagnetic wave detector or light wave detector. Examples of known technology in this area include U.S. Pat. Nos. 5,784,021 and 5,151,701.

Existing radar detectors' inability to provide alerts in advance of receiving the electromagnetic signal limits each driver's capability to safely adjust his or her driving while approaching a threat or other safety hazard. Radar detectors are also encumbered by sources of false positives, including motion-sensing doors on commercial buildings, motion-detecting burglar alarms, other radar detectors, and light signals emitted from sources other than laser guns. More recently, makers of luxury automobiles have begun offering "collision detection" systems that use microwave motion sensors mounted around the vehicle. A radar detector following one of these vehicles may provide a false alert based on a collision detection system, which may diminish the motor vehicle operator's experience. These factors, taken together, make radar detection problematic.

U.S. Pat. Nos. 6,118,403, 6,384,776, 6,670,905, 6,895,324, and 7,471,236 describe radar detectors and radar detector systems. However, none of the systems overcome the various problems associated with existing radar detectors. In addition, none of the systems provide alerts or predictions based upon a statistical analysis of centralized aggregated data.

U.S. Pat. No. 6,118,403 to Lang generally describes a "Speed Trap Information System." Generally, the system uses radar detectors and a central server to collect information detected by radar detectors and provide the information as it was received to other radar detectors. However, the '403 patent does not teach a system for analyzing the information for potential false readings. For example, the server receives "speed detecting equipment information and physical location information" from one radar detector and transmits the same information to "authorized users." Accordingly, the '403 patent does not teach performing a statistical analysis for determining whether or not the "speed detecting equipment information" represents a false reading nor does the patent teach any analysis to determine the likelihood that an alert should be predicted at a later time.

U.S. Pat. No. 6,384,776 to Martin generally describes an "EM Signal Detection and Position Broadcasting System and Method." Generally, the '776 patent describes using a plurality of radar detectors that broadcast electromagnetic signal positions to other radar detectors. For example, when an electromagnetic signal is detected by one such radar detector, it broadcasts the electromagnetic signal position for any other radar detectors of the system to receive, regardless of whether any other radar detectors are with in the broadcast signal's range. As an alternative to the peer-to-peer broadcasting system, the '776 patent describes using a base station to pass along received electromagnetic signal positions, operating like the system described in the '403 patent. However, like the '403 patent, the '776 patent provides no disclosure of an analysis relating to the potential for false readings or predictability of a threat at a later time.

U.S. Pat. No. 6,670,905 to On generally describes a "Radar Warning Receiver with Position and Velocity Sensitive Functions." Generally, the patent describes a radar detector which is associated with a local list of stationary locations and the capability to compare the radar detector's current location to the list of stationary locations indicating whether to reject a signal based upon proximity to a listed unrelated source. However, the '905 patent does not disclose a centralized data repository or system that may aggregate and analyze information from one or more radar detectors. Therefore, like the '403 patent, the '905 patent does not provide a disclosure to overcome the problems of existing radar detectors. The '905 patent does not teach an analysis to statistically filter out potential false readings and the '905 patent provides no analysis to predict the probability of a threat at a later time.

U.S. Pat. No. 6,895,324 to Straub generally describes "Methods and Apparatus for Storing, Accessing, Generating and Using Information About Speed Limits and Speed Traps." Generally, the system of the '324 patent describes a device (which may be a radar or laser detector) that is used to identify speed traps based upon the opinion of an operator and transmit the location and a timestamp to a centralized location, and receives information describing the speed trap inputs from other drivers and speed limits in the area. In an embodiment, the '324 patent discloses that locations of signals received by a radar or laser detector may be stored as speed trap locations. However, like the '403 patent, the '324 patent provides no disclosure of an analysis relating to the potential false readings or predictability of a threat at a later time. Another drawback to the system of the '324 patent is that information is not analyzed and is based upon potentially false readings, opinions of device operators, and any false reports of speed traps whether intentional or unintentional.

U.S. Pat. No. 7,741,236 to Pitt, et al. generally describes a "Cellular Augmented Radar/Laser Detector." Generally, the system of the '236 patent uses a plurality of radar detectors with cellular capability to transmit emission detection information between other radar detectors. For example, when an electromagnetic signal is detected by one such radar detector, it transmits the emission detection information to other radar detectors of the system over the cellular network based upon a proximity to cellular towers. As an alternative to the cellular peer-to-peer broadcasting system, the '236 patent describes using a central database to store and pass along current detection information received from radar detectors of the system, operating like the system described in the '403 patent. However, like the '403 patent, the '776 patent provides no disclosure of an analysis relating to the potential for false readings or predictability of a threat at a later time.

Existing radar detectors and radar detector systems do not overcome problems with minimizing false alerts while providing advance statistical predictions of potential threats.

SUMMARY

A radar detector is fundamentally a device that turns data into actionable information. Data problems like these may be solved with database architectures and analysis algorithms. These analysis algorithms can sift through the noise and variance inherent in the sampling methodology to provide more precise actionable information. Some problems with radar detectors may be minimized by applying database analytical strategies. Generally, networked radar detectors may communicate the radar detectors' data for a geographic location to a server that executes analysis algorithms to analyze the aggregated data and make predictions about law enforcement speed monitoring activities and potential safety risks at the geographic location. The server provides alert management that dynamically adjusts alerts based on statistical probabilities and communicates the predictions to the networked radar detectors near the geographic location. The networked radar detectors at the geographical location communicate threat levels and/or predictions of alert levels to motor vehicle operators and/or passengers as alerts. These alerts will help motor vehicle operators minimize the risks associated with law enforcement speed monitoring activity and reduce the probability that a radar detector user will fall into a police speed trap. This present invention may also lead to larger zones of safe driving in compliance with local laws; a goal sought by all traffic regulating authorities.

It is an object of the present invention to overcome and/or minimize potential problems associated with radar detectors.

It is a further object of the present invention to improve the application and/or implementation of data stored by a database for networked radar detectors.

It is a further object of the present invention to communicate to a user various levels of alerts based on data received from networked radar detectors.

It is a further object of the present invention to reduce false alerts thereby improving the radar detector user's experience.

It is a further object of the present invention to enable a server to identify which aggregations of data are indicative of law enforcement speed monitoring activities and which are indicative of passive radar sources.

It is a further object of the present invention to enhance the safety of the driving experience through the knowledge and advanced warning of potential threats such as police speed traps, emergency vehicles, school busses, traffic hazards, and other locations such as school zones, daycares, and hospitals.

It is a further object of the present invention to minimize false alerts while providing advanced statistical predictions of potential threats.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. It will be understood that the invention may be embodied in other specific forms without departing from the spirit or central characteristics thereof. The present embodiments, therefore, are to be considered in all respects as illustrative and not restrictive, and the invention is not to be limited to the details given herein. One skilled in the art will recognize that the predicted alert levels, alert probabilities, predictions, and threat levels are synonymous and based upon an analysis of data by analysis algorithm 124 whether located in the electromagnetic signal detector, server or elsewhere, and alert level, detection alert level and initial alert level are based upon an electromagnetic signal detectors normal operation and detection of a signal, prior to an analysis by the analysis algorithm 124.

Figure 1:
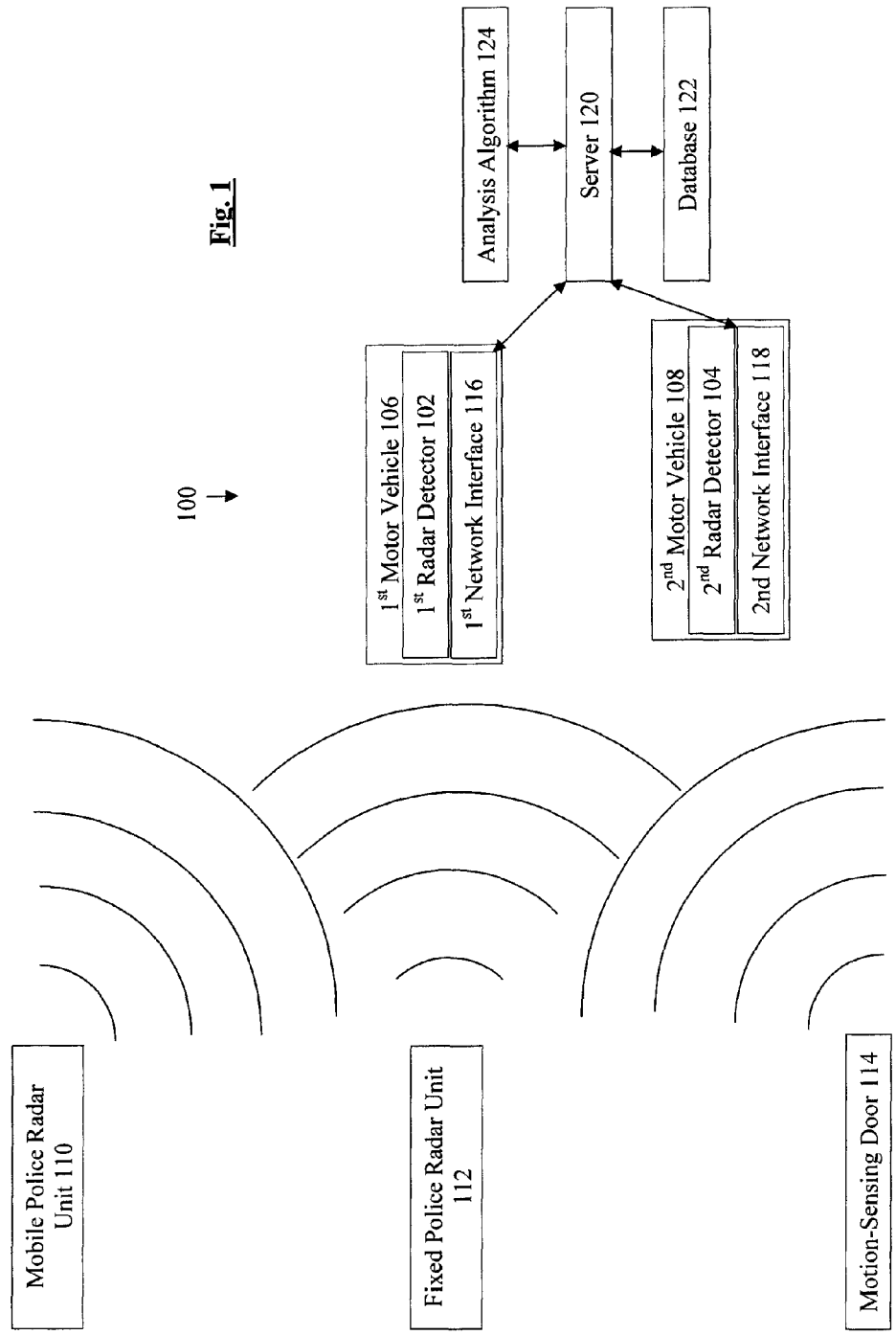
FIG. 1 is a block diagram depicting an embodiment of the system of the present invention.

With reference to FIG. 1, a block diagram depicts the system 100 according to an embodiment of the present invention. The depicted system 100 includes a first radar detector 102 and a second radar detector 104. The first radar detector 102 is used by a first motor vehicle 106 and the second radar detector 104 is used by a second motor vehicle 108. Electromagnetic signal devices depicted in FIG. 1 include a mobile police radar unit 110, such as a police motorcycle equipped with a radar gun, a fixed police radar unit 112, such as a traffic light camera or fixed speed camera, and a motion-sensing door 114, such as an automatic front door for a restaurant that is situated towards the road on which the motor vehicles 106-108 are travelling. The radar detectors 102-104 may detect electromagnetic waves emitted from devices 110-114.

The system 100 may also include a first network interface 116, a second network interface 118, a server 120, a database 122, and an analysis algorithm 124. The network interfaces 116-118 may enable the radar detectors 102-104 to communicate via a communication network, such as a cellular telephone network, a satellite network, a Wi-Fi, another wireless network, and/or the Internet. The network interfaces 116-118 may be incorporated into a single device with radar detectors 102-104 or may be otherwise associated with radar detectors 102-104 through wired or wireless communication. As one skilled in the art will recognize, the system may operate on one or more public networks, private networks or combinations of public and private networks. As one skilled in the art will recognize, the system 100 may include any number of radar detectors 102-104, motor vehicles 106-108, electromagnetic emitting devices 110-114, network interfaces 116-118, servers 120, databases 122, and analysis algorithms 124 and should not be limited to the illustrative example provided in FIG. 1.

The first radar detector 102 accesses the first network interface 116 that promotes communication of data to and from the server 120. Similarly, the second radar detector 104 accesses the second network interface 118 that promotes communication of data to and from the server 120. Each of the radar detectors 102-104 and the server 120 has the ability to initiate the process of sending or receiving data. The data may relate to location, speed, and/or acceleration of the motor vehicles 106-108, law enforcement activity, detectable electromagnetic waves, traffic patterns and/or conditions, safety alerts, evacuation notices, and/or any other hazards or alerts, identified and flagged at the discretion of the server 120 and/or the users of the radar detectors 102-104. As one skilled in the art will recognize, law enforcement activity includes speed traps, speed cameras, red light cameras, and any law enforcement personnel and/or device enforcing traffic laws. The data may also include driving patterns of vehicles 106-108 and/or specific driving patterns of individuals including patterns relating to the driver's typical reaction to specific alerts under specific circumstances. This allows server 120 to utilize database 122 to customize the alert levels it uploads for each user in order to adjust the alert levels to correlate to the advanced warning desired by the driver.

For example, the first radar detector 102 detects the fixed police radar unit 112 and the motion sensing door 114 and communicates data representing these detections to the server 120. In another example, the second radar detector 104 also detects the fixed police radar unit 112 and the motion sensing door 114 and communicates data representing these detections to the server 120. As one skilled in the art will recognize, radar detectors 102-104 and server 120 may communicate data in real-time or may communicate data based upon a schedule, a triggering event (such as reaching a data quantity threshold or a data storage size threshold), and/or a combination of a schedule and triggering event and remain within the scope and spirit of the invention. For example, radar detector 102 detects the fixed police radar unit 112 and the motion sensing door 114 and stores data representing these detections in internal memory, such as a buffer. Once a threshold quantity of data is surpassed in the buffer, radar detector 102 communicates data representing these detections to the server 120. For another example, radar detector 104 may not receive any detection while travelling other roadways and stores data representing the absence of detections along the travelled path. At scheduled times radar detector 104 may communicate data representing the absence of detections to the server 120.

Upon receipt of such data, the server 120 stores the data into physical or electronic memory in the database 122, which may be part of the server 120 or separate from the server 120. The server administrators may also add other data to the database 122 (pertaining to law enforcement, safety, hazards, public notices, local knowledge, or driving in general) that are not measurable in the electromagnetic and laser spectrums of the radar detectors 102-104. This additional data may be updated periodically by the server 120, automatically or through manual data entry. Some data changes frequently, like weather conditions and traffic conditions in local areas. Other data changes infrequently, such as "line segment" approximations of road maps and physical locations of school zones and/or law enforcement monitoring installations. These installations include but are not limited to red light and speed cameras. The analyzed data includes the data from the radar detectors 102-104, other data added by administrators as indicated above, and data from other data suppliers, such as local knowledge and observed conditions.

The server 120 executes analysis algorithms 124 that periodically collect, sort, organize, and analyze the data. In a preferred embodiment, the data is associated with database 122, but as one skilled in the art will recognize, analysis algorithms 124 may incorporate or otherwise analyze data from sources other than database 122 and remain within the scope and spirit of the invention. These analysis algorithms 124 may include statistical or predictive calculations relating to the likelihood of future threats, hazards, alerts, law enforcement speed monitoring activity, or traffic conditions. The storage capacity and processing capacity of the radar devices 102-104 may be significantly less than the storage capacity and the processing capacity of the database 122 and the server 120. As a result, the database 122 and the server 120 may provide the capability to execute complex analysis algorithms 124 using significant quantities of aggregated data, including data that is not readily available to the radar detectors 102-104. The output of each analysis algorithm 124 may be a calculated predictive threat level value or series of values that attempts to approximate and quantify the statistical likelihood of there being law enforcement monitoring activity and/or other safety risks in the geographic locations ahead of or in the immediate vicinity of the motor vehicles 106-108. In some embodiments, the analysis algorithm may tailor the resulting threat level value or values to an individual radar detector and/or driver based in part upon any considerations entered by the user and/or the user's stored driving patterns. The analysis algorithm may also consider the current day, time, geographic location, heading, speed and acceleration of motor vehicles 106-108 to tailor a predicted alert value.

The "crowd-sourcing" method of data aggregation is based on analyzing data aggregated from multiple data sources, such as the radar detectors 102-104. The "crowd-sourcing" method of data aggregation may produce more accurate results than analysis based on a single source of data, such as data from one of the radar detectors 102-104.

For example, the analysis algorithm 124 analyzes data that represents detection of electromagnetic signals from the fixed police radar unit 112 by the radar detectors 102-104 and calculates a very high threat level, such as a 95% certainty, that the fixed police radar unit 112 is a law enforcement speed monitoring device. This prediction may be based on a single factor or a combination of factors. For this example, the same pattern of the electromagnetic waves repeatedly detected from the fixed police radar unit 112 by the radar detectors 102-104 on a frequent basis may be highly indicative of a law enforcement speed monitoring device. Additionally, the data may indicate that the source of these electromagnetic waves never moves and never ceases to emit electromagnetic waves because there is no data indicating an absence of detections from this location. The regularity indicated by this data combined with geographic data that approximates the source of these electromagnetic waves at a busy traffic intersection may enable the analysis algorithm 124 to predict that the fixed police radar unit 112 is a speed-detecting traffic camera fixed at the intersection. An additional factor used to calculate a threat level may be a confirmation of law enforcement speed monitoring activity input by a radar detector user. The analysis algorithm 124 may modify the high probability of 95% certainty to 100% certainty if a specified number of radar detector users submit such confirmations.

In another example, the analysis algorithm 124 analyzes data that represents detection of electromagnetic signals from the motion-sensing door 114 by the radar detectors 102-104 and calculates a very low threat level, such as a 5% certainty, that the motion-sensing door 114 is a law enforcement device or other safety risk. This prediction may be based on a single factor or a combination of factors. For this example, the same pattern of the electromagnetic waves repeatedly detected from the motion-sensing door 114 by the radar detectors 102-104 on a frequent basis may not be highly indicative of a law enforcement device or other safety risk. Additionally, the data may indicate that although the source of these electromagnetic waves never moves, the emission of the electromagnetic waves and the absence of detections of the electromagnetic waves coincides with normal business hours for a restaurant. The regularity indicated by this data combined with geographic data that approximates the source of these electromagnetic waves at a restaurant may enable the analysis algorithm to predict that the motion-sensing door 114 is not a law enforcement device or other safety risk. Although a calculation of a threat level may be based on a motion-sensing door 114 and these exemplary factors, predictions may be based on other types of electromagnetic wave devices and other factors. As one skilled in the art will recognize, a prediction may consider signal analysis including the signal band analysis, signal frequency analysis, signal strength or intensity measurements, and/or any other signal analysis. For example, the received signal band may be compared to known signal regulations imposed by the FCC or other regulatory or licensing body. For instance, if the signal is in the X or K bands it may be a motion-sensing door, however, if the signal is in the Ka band it is unlikely to be a motion-sensing door. For another example, the received signal band may be compared to previously identified signal bands stored in database 122. For instance, database 122 may have stored information associated with one geographic location regarding an X band signal that has a high probability of representing law enforcement activity and a Ka band signal that has a low probability of representing law enforcement activity. If a received signal is in the Ka band, the previously identified Ka band signals in the geographic location may factor in analysis algorithm 124 calculating a low probability of the received Ka band signal representing law enforcement activity. A known Ka band microwave communication tower is an example of a non-law enforcement source that may be factored into analysis algorithm 124.

A third radar detector (not depicted in FIG. 1) may derive the benefits from the system 100 based on detections made by the first radar detector 102 and the second radar detector 104 even when the third radar detector approaches the fixed police radar unit 112 for the very first time. The third radar detector may provide an alert for the fixed police radar unit 112 without having previously observed and recorded any band emissions from that geographic location. The alert provided by the third radar detector may be based upon periodically received data from server 120 pertaining to predicted probabilities and/or threat levels for potential threats in the local area. Therefore, the system 100 may provide benefits to radar detector users who have never travelled on a specific road segment before based on data from the multiple radar detectors 102-104 that have previously travelled on the specific road segment. Similarly, devices other than radar detectors which are capable of receiving predicted alert levels and/or threat levels in the local area from server 120 may also provide alerts based on data from the multiple radar detectors 102-104.

When signals are detected, an alert level may be based upon the predicted probability, or threat level, that the detected signals represent a law enforcement monitoring device or other safety risk. When signals are not detected, an alert level may be based upon the predicted probability, or threat level, that a law enforcement monitoring device or other safety risk is within a vicinity determined by radar detector 102, server 120, and/or defined by a user. The alert level may be defined in any number of levels whereby each alert level is correlated to a range of probabilities. For example, if there are two alert levels, a 0-50% probability may represent no threat or a weak or irrelevant received signal or an ignore level while a 51-100% probability may represent a high threat level, and/or strong and/or highly relevant received signal. For another example, four alert levels may be defined by probability ranges 0-40% (no threat or an ignore level), 41-65% (minor threat), 66-85% (mid-level threat), and 86-100% (high threat). For another example, five alert levels may be defined based upon ranges along a probability scale from −50 to 50, whereby probability ranges of −50 through −30 represent a no threat or an ignore level, probability ranges of −29 through −1 represent a minor threat, probability ranges of 1 through 30 represent a mid-level threat, probability ranges of 31 through 50 represent a high threat, and a probability of zero indicates no stored data for analysis.

The server 120 may calculate a multitude of probabilities and/or associated threat levels based on specific subsets of the data, i.e. for specific times of the day, days of the week, or months of the year. The alert levels may also be based on data associated with specific geographic location boundaries. This process may create threat levels specific to grid regions bounded by latitude and longitude, or specific to "road segments" where detailed map data is available. In addition, the server 120 may associate a weighted factor to various data to represent the strength and/or reliability of the data. For example, a diminishing weight factor may be associated with data based on the age of the data such that older data has a lower weight factor. One skilled in the art will recognize that many variables may be considered to determine a weight factor for any data, different weight factors may be applied for different calculations, weight factors may change over time for all data or specific data, and multiple weight factors may be associated with any data to effect the overall weight of the evidence during analysis and remain within the scope and spirit of the invention.

Threat levels and/or the probabilities may be stored in physical or electronic memory on the server 120 and/or the database 122. For example, the server 120 may store the 95% probability for the fixed police radar unit 112 and the 5% probability for the motion-sensing door 114 in the database 122 associated with the geographic location for the road segment currently travelled by the motor vehicles 106-108. The radar detector user may respond differently to predicted probabilities, such as 95%, 50%, and 5%. For example, the user of radar detector 102 may program radar detector 102 to provide a minor alert level if there is a 50% predicted probability or threat level, while the user of radar detector 104 may program radar detector 104 to provide a no alert or an ignore level if there is a 50% predicted probability, or threat level.

The density of data stored for any geographic location may vary by region. Database algorithms may automatically balance the data density for specific regions based on population density, data density, or other factors in each region. The server 120 may adjust how frequently the analysis algorithms 124 are executed, and evaluate how an ever-enlarging set of data impacts the efficiency of the analysis algorithms 124.

The server 120 may instruct radar detectors 102-104 to occasionally override, mute, or alter any audible alerts that the server 120 identifies as highly likely to be false alerts, thereby suppressing false alerts in real-time or near-real time as needed. For example, the server 120 may instruct radar detectors 102-104 to provide the 95% threat level and/or a high alert to the motor vehicles 106-108 travelling on the road segment associated with the fixed police radar unit 112, but suppress the 5% threat level and/or an ignore for the motion-sensing door 114 located nearby the same road segment. In addition, radar detectors 102-104 may provide an anticipatory alert based upon a high threat level in the anticipated travel segment. For example, radar detector 102 may provide an anticipatory alert prior to receiving a radar signal from fixed police radar unit 112 when motor vehicle 106 is travelling towards fixed police radar unit 112 with a determined 95% threat level. In addition, radar detector 102 may increase the given alert once a signal is received from fixed police radar unit 112.

The threat levels and/or probability that the analysis algorithm 124 may predict and that the server 120 may communicate to the radar detectors 102-104 are supplementary to the normal operation of the radar detectors 102-104. For example, the mobile police radar unit 110 may arrive on a police motorcycle at a geographic location where electromagnetic waves have never been detected by the radar detectors 102-104 previously. However, the first radar detector 102 may still detect the mobile police radar unit 110 and provide an alert level and/or detection alert level to the operator of the first motor vehicle 106 even before the first network interface 116 communicates data representing this detection to the server 120. Radar detector 102 also may or may not check its internal database for a probability or threat level before communicating an alert to the user. For example, the first radar detector 102 may determine that the detected signal is not stored in the internal memory of radar detector 102 and communicate an alert to the user based upon the internal analysis and settings of radar detector 102 for new or unrecognized signals. In one embodiment, a default setting of radar detector 102 would treat new or unrecognized signals as a threat and provide a default alert or a detection alert unless an internal analysis indicated that the signal is likely a false positive. In addition, while the radar detector 102 is providing an initial alert to the user, it also may communicate the signal to server 120 for further analysis. Server 120 may recognize that the signal is not in the database and communicate an anticipatory alert based upon the probability that the new electromagnetic wave is a police monitoring unit or other safety risk, or the server 120 may provide a default threat level until additional data is received and analyzed. Server 120 may send a different threat level than radar detector 102 determined, because server 120 may utilize more aggregated data and/or a more thorough analysis algorithm 124 than radar detector 102, which may lead to differences in probability determinations.

Alternatively, mobile police radar unit 110 may be turned off until the operator turns it on to specifically target a vehicle. This may prevent radar detector 102 from receiving the electromagnetic signal until the operator of mobile police radar unit 110 targets a car in the vicinity. However, once radar detector 102 receives the signal and uploads it to server 120, server 120 may provide an update to a memory component of radar detector 104 such that as radar detector 104 approaches the location of this threat, radar detector 104 provides an anticipatory alert prior to receiving the electromagnetic signal from mobile police radar unit 110.

The server 120 communicates the predictions based on specific geographic locations to each of the radar detectors 102-104 based on the corresponding geographic locations associated with each of radar detectors 102-104. As one skilled in the art will recognize, geographic locations associated with radar detector 102 may include the geographic area in which radar detector 102 is currently located, geographic areas which radar detector 102 is approaching or likely to approach, geographic areas designated by the user of radar detector 102, and/or suggested by a mapping or navigation component or device. One skilled in the art will also recognize that the size, shape, scope, calculation, and/or any defining parameters of an associated geographic area may vary and remain within the scope and spirit of the present invention. Each of the radar detectors 102-104 periodically receives or downloads a subset of these predicted alert levels and/or threat levels from the server 120 that correspond to the current geographic locations associated with each of the radar detectors 102-104, including for example road segments currently traveled and road segments likely to be traveled in the future, and/or the particular time of day, day of week, or month of year. Each of radar detectors 102-104 uses its location identifier and corresponding timestamp data to provide real-time predicted alert levels specific for the corresponding motor vehicles 106-108 using the radar detectors 102-104, on that day, at that time, at that geographic location, on that heading, at that speed and acceleration, under those weather and traffic conditions.

In an embodiment, radar detectors 102-104 may be operably associated with a navigation component or device. In such an embodiment, the geographic location associated with radar detectors 102-104 may include the route suggested by the navigation component or device. The analysis algorithm 124 may calculate predicted threat levels based upon data associated with the roadway radar detector 102 is currently located on and any roadways likely to be travelled, and may consider the speed, conditions, direction of travel, history of driving, and/or any other factors associated with travel on the road segments. Radar detector 102 may promote the navigation component or device to suggest alternate routes if an alert probability threshold is surpassed. Alternatively, the radar detector user may respond to threat levels associated with a primary route suggested by the navigation application by requesting the navigation application to suggest an alternative route.

One skilled in the art will recognize that the location identifier may operate based on a relative location based system, a latitude/longitude system, another coordinate system, a map or road segment based system (such as one supplied by Google, Inc., Navteq or similar companies), a cellular or Wi-Fi triangulation system, any other system for identifying a location and/or any combination of location systems. In one embodiment, radar detectors 102-104 use a Global Positioning System (GPS) receiver as the location identifier. In another embodiment, radar detectors 102-104 use a device determining the current map segment position (or proximity to the nearest map segment) as the location identifier. One of skill in the art will recognize that a map segment is a representation of a physical road segment.

For example, the server 120 may provide the threat levels for a geographic area containing the fixed police radar unit 112 and a second geographic area containing the motion-sensing door 114 to the second motor vehicle 108 because the geographic locations for the second motor vehicle 108 indicate that the second motor vehicle 108 is currently approaching or may approach the fixed police radar unit 112 and the motion-sensing door 114. Conversely, the server 120 no longer provides the threat levels for the fixed police radar unit 112 to the first motor vehicle 106 because the geographic locations for the first motor vehicle 106 indicate that first motor vehicle 106 has already passed and is currently moving away from the fixed police radar unit 112.

The server 120 may also communicate the predictions based on specific geographic locations to a mobile communication device, such as a mobile telephone which is not depicted in FIG. 1, based on a corresponding geographic location for the mobile communication device. In some embodiments, the mobile communication device must subscribe to a threat level service. Although the mobile communication device may not have the capacity to detect electromagnetic signals, the mobile communication device user may act as an additional data supplier by submitting a confirmation of law enforcement speed monitoring activity associated with the geographic location of the mobile communication device. In some embodiments, the mobile communication device may act as network interface 116 by transmitting and receiving data with server 120 and radar detector 102. As one skilled in the art will recognize, a mobile communication device may be any device that can be operably associated with server 120, including a mobile phone, a smart phone, a satellite phone, a portable computer, a navigation system with wireless connectivity, an electromagnetic signal detector, a citizens band radio, and/or any other device with wireless connectivity. In addition, a device without wireless connectivity, such as a navigation system or GPS system without wireless connectivity, may employ a static but updatable version of the system by downloading a database of threat levels from server 120 into the device's storage element. The device without wireless connectivity could communicate predicted alerts to the user of such device based on the threat levels stored in the device. The database in the device could be updated periodically by the user by connecting the device to a networked device or an external storage device, such as a portable hard drive, in which the database is stored.

Each of the radar detectors 102-104 communicates an alert level to a corresponding radar detector user based on predictions, or threat levels, that correspond to the geographic locations of the radar detectors 102-104, as well as other predictive data described above. The resulting alert may be communicated to the radar detector user through a display, a mechanical response, and/or an audible or voice alert via the radar detector or another mobile device, such as a mobile telephone. For example, the second radar detector 104 flashes red, beeps rapidly, displays a 95% alert level, and provides a voice alert that identifies a 95% alert level when the second vehicle 108 approaches the fixed police radar unit 112. Each of the radar detectors 102-104 may communicate the initial detection alert level, a predicted alert level or threat level, and/or a combined alert level to a radar detector user. In addition, each of the radar detectors 102-104 may communicate other relevant data, such as local traffic, safety or evacuation notices, For example, the first radar detector 102 may provide a first display showing a medium detection alert, a second display showing a 85% probability threat level, a third display showing a combined 95% alert level, and an audible voice alert providing notice that speed limits in the local area are known to be strictly enforced. This will allow, in turn, motor vehicle operators to become more cognizant of traffic conditions by being warned in advance to adhere to the posted speed limits, to avoid collisions with or the obstruction of emergency vehicles and avoiding possible hazards such as accidents, weather and other road hazards. As one skilled in the art will recognize, the display may be color change on the radar detector, a series of light-emitting diodes, a liquid crystal display, and/or any other display known or yet to be discovered and will remain within the scope and spirit of the invention. As one skilled in the art will recognize, the mechanical response may be a change to the vehicles operation, such as automatically decelerating the vehicle as a safety risk approaches, and/or any other mechanical response known or yet to be discovered and will remain within the scope and spirit of the invention. As one skilled in the art will recognize, the audible alert may be a beep, buzz, voice response, and/or any other audible alert known or yet to be discovered and will remain within the scope and spirit of the invention.

Radar detectors 102-104 include data storage components such as a buffer or other form of memory and data processing components. In one embodiment, these components may contain a selected data set and be capable of processing all or portions of analysis algorithm 124 within radar detectors 102-104 for the data set in memory. For example, radar detector 102 may contain a data set in memory relating to the surrounding geographic area that includes predicted alert levels within that geographic area. As radar detector 102 is in use it collects additional data relevant to the same geographic area and aggregates the collected data with the stored data, and analysis algorithm 124 calculates updated probabilities and threat levels based upon the aggregated data. This embodiment allows continued updating in a given area without connection to server 120 permitting continued analysis without taking up the communication network's bandwidth and/or analysis when connection to server 120 is not available. Communication with server 120 may be based upon a schedule to upload collected data to server 120 and a schedule to download any updated data from server 120. For example, if a server predicts a change in threat levels in the geographic area to occur around 4:30 p.m., it may initiate a download of updated threat levels to radar detector 102 at 4:15 p.m. In addition, communication with server 120 may be triggered by specified events. For example, as radar detector 102 approaches the boundary of data within the currently stored data set, radar detector 102 may initiate communication with server 120 in order to download an updated data set based upon the current location of radar detector 102 and the direction of travel. As one having skill in the art will recognize, the extent and scope of the data set stored in memory of radar detectors 102-104 and the extent of analysis conducted within the data processor of radar detectors 102-104 may vary and remain within the scope and spirit of the present invention.

Figure 2:
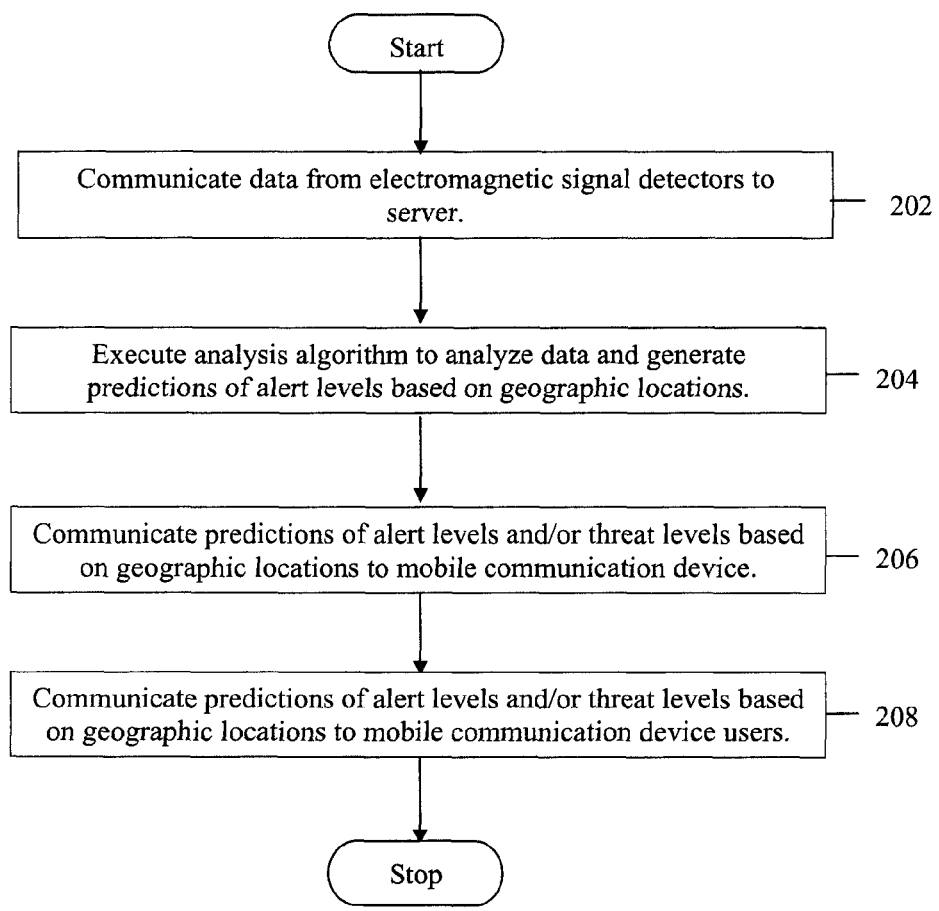
FIG. 2 is a flowchart depicting an embodiment of the process of the present invention.

FIG. 2 is a flowchart depicting an embodiment of process 200. The process 200 may be a method executed by the system 100 and/or a computer program product to provide predictions based on data analyzed from networked radar detectors.

In box 202, data is communicated from electromagnetic signal detectors to a server. For example, the first radar detector 102 and the second radar detector 104 communicate data that indicates detection of the fixed police radar unit 112 to the server 120.

In box 204, an analysis algorithm is executed to analyze data and generate predictions of alert levels based on geographic locations. For example, the analysis algorithm predicts a 95% probability, or threat level, that the fixed police radar unit 112 is a law enforcement speed monitoring device based on the aggregated data received from the first radar detector 102 and the second radar detector 104. As one skilled in the art will recognize, the aggregated data may also include information received other radar detectors associated with the system which have passed through the identical segment or segments in close proximity to that segment and/or any other data sources which are associated with or entered into the system. In addition, one skilled in the art will recognize that a plurality of radar detectors is not necessary because a single radar detector may collect data for aggregation over time, thereby supporting the predictive analysis.

In box 206, predictions of alert levels and/or threat levels based on geographic locations are communicated to a mobile communication device. For example, the server 120 communicates the 95% probability and/or a high threat level to the radar detectors 102-104 whenever any of the radar detectors 102-104 approach the geographic location likely to contain fixed police radar unit 112.

In box 208, predictions of alert levels and/or threat levels based on geographic locations are communicated to mobile communication device users. For example, the second radar detector 104 receives the 95% probability, or threat level, and communicates an alert level to the operator of the second motor vehicle 108 whenever the second motor vehicle approaches the geographic location likely to contain fixed police radar unit 112.

The radar detectors 102-104 and/or their mobile communication devices may utilize the "cloud computing" software usage model, where individual client devices can quickly begin using the latest software without the need for a firmware update or hardware revision. Changes made on the database or "cloud" side may be seen in near-real-time for the installed client/user base.

On boot, the radar detectors 102-104 may query the server 120 and/or the database 122 for any updates to the data upload packet protocol, and download any updates as appropriate. This may be a simple software change, a firmware update, and/or any other method for updating. Once the packet protocol is loaded, the radar detectors 102-104 may read data coming from the logging outputs of the radar detectors 102-104 in real time, and may parse that data according to the loaded packet protocol before reformatting the data and uploading the data to the server 120. Based on the volume of data that the server 120 receives from the radar detectors 102-104, the server 120 may adjust the packet protocols and parsing algorithms to get the highest quality of data using the lowest possible bandwidth.

In another embodiment, radar detectors 102-104 have a proximity mode designed for use when multiple radar detectors and/or mobile communication devices are within a certain proximity to one another. Server 120 may monitor the geographic proximity of radar detector 102 to radar detector 104. When server 120 determines that radar detectors 102-104 are within a certain proximity to one another, server 120 may transmit instructions to radar detectors 102-104 to execute in proximity mode. In the proximity mode, radar detectors 102-104 operate with a real-time or near-real-time communication with server 120 which analyzes and transfers updates to each radar detector in the given proximity. For example, when radar detectors 102-104 are within a given proximity and operating in proximity mode, if radar detector 102 detects an electromagnetic signal, radar detector 102 communicates data regarding the detected electromagnetic signal to server 120 in near-real time. Server 120 analyzes the new data from radar detector 102, updates threat levels based upon the new data, and communicates the updated threat levels to radar detector 104 in near-real time. When radar detectors 102-104 separate beyond a certain proximity, both radar detectors exit out of proximity mode (unless one is within proximity to another device). As one skilled in the art will recognize, what constitutes a certain proximity may vary, and the proximity for entering proximity mode and exiting proximity mode may be the same or may differ and remain within the scope and spirit of the invention. Proximity mode's functional distance may vary based on vehicle speed, heading, time of day, volume of data in the database at that location, or any other criteria not listed here, and remain within the scope and spirit of the invention.

Figure 3:
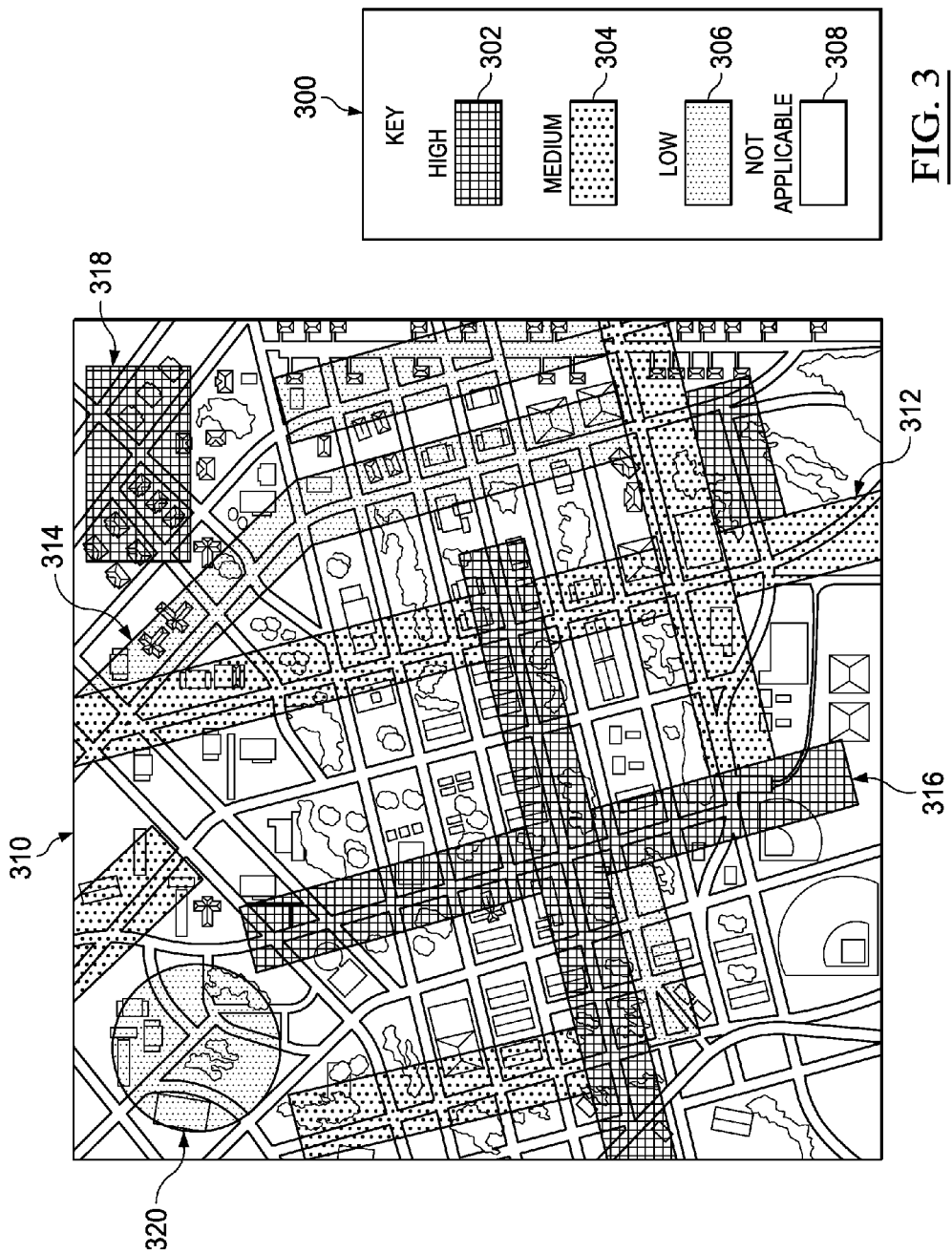
FIG. 3 is a depiction of a map illustration of an embodiment of the present invention.

FIG. 3 depicts one embodiment of a map illustration with overlaid threat levels. The map illustration may be displayed on any display associated with a mobile communication device. For example, the display may be shown on a mobile phone, a portable computer, and/or an electromagnetic signal detector having a display.

Key 300 shows the overlay styles and associates a meaning, such as the threat level, with each style of overlay. As one having skill in the art will recognize, any meaning may be associated with a given overlay style and remain within the scope and spirit of the invention. In the depicted embodiment, there are four overlay styles: overlay design 302 associated with a high threat level, overlay design 304 associated with a medium threat level, overlay design 306 associated with a low threat level, and overlay design 308 associated with a not applicable threat level due to a lack of data. As one skilled in the art will recognize, any number of overlays may be employed and remain within the scope and spirit of the invention. In addition, any overlay design may be used, including color overlays, line designs (such as those pictured), other designs and/or any combination of colors and designs.

Map 310 depicts a street layout with portions overlaid with threat levels associated with key 300. For example, overlay segment 312 has overlay design 304 indicating the road section covered by overlay segment 312 has a medium threat level; overlay segments 314 and 320 have overlay design 306 indicating the road sections covered by overlay segments 314 and 320 have a low threat level; and overlay segments 316 and 318 have overlay design 302 indicating the road sections covered by overlay segments 316 and 318 have a high threat level. In addition, the portions of map 310 not overlaid with overlay designs 302-306 are overlaid with overlay design 308 indicating that a threat level is not applicable due to a lack of data in areas covered by overlay design 308. Overlay segments may be associated with specific road segments, such as those depicted by overlay segments 312-316, or may be based upon an area evaluation, such as the rectangular overlay segment 318 and radial overlay segment 320 depicted in this embodiment. As one skilled in the art will recognize, overlay segments may correlate to individual road segments, grid sections of a map, geographical areas, shapes, and/or any design related to the map or the geographical area the map represents, and remain within the scope and spirit of the invention.

As one skilled in the art will recognize, the various overlay segments 312-320 may change which overlay design is displayed as the mobile communication device downloads an update from server 120. For example, server 120 may predict that a road section covered by a portion of overlay segment 314 should be associated with a high threat level based upon data collected by radar detector 102. Accordingly, once radar detector 104 downloads the update, the relevant portion of overlay segment 314 will depict overlay design 302 indicating the high threat level, while the remainder of overlay segment 314 will maintain overlay design 306 indicating a low threat level. For an additional example, individual road segments may change color on map 310 to indicate reevaluated threat levels.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the system, method, or computer program product described.

The invention claimed is:

1. A networked electromagnetic signal detector, comprising:
   an electromagnetic signal detector;
   a transmission element that transmits data based on a detection of an electromagnetic signal by said electromagnetic signal detector to a server;
   a reception element that receives a prediction of an alert level from said server, wherein said prediction is based on an analysis of data aggregated from at least one networked electromagnetic signal detector and a geographic location associated with said networked electromagnetic signal detector; and
   a user interface to communicate said prediction to a user of said networked electromagnetic signal detector.

2. The networked electromagnetic signal detector of claim 1, wherein said electromagnetic signal is one of a radar wave and a light wave.

3. The networked electromagnetic signal detector of claim 1, wherein said transmission element and said reception element are components of a network interface.

4. The networked electromagnetic signal detector of claim 1, wherein said data further comprises information related to at least one of a geographic location, a speed, and an acceleration associated with a motor vehicle that is using said electromagnetic signal detector.

5. The networked electromagnetic signal detector of claim 1, wherein said data further comprises information related to at least one of a heading, a timestamp, and a time interval associated with a motor vehicle that is using said electromagnetic signal detector.

6. The networked electromagnetic signal detector of claim 1, wherein said prediction of said alert level is based on at least two alert levels.

7. The networked electromagnetic signal detector of claim 6, wherein said prediction of said alert level is further based on at least one of the time of the day, the day of the week, and the month of the year.

8. The networked electromagnetic signal detector of claim 6, wherein said prediction of said alert level is further based on said geographic location.

9. The networked electromagnetic signal detector of claim 6, wherein said prediction of said alert level is further based at least one of signal strength, signal intensity, and the band of said electromagnetic signal.

10. The networked electromagnetic signal detector of claim 1, wherein said user interface communicates said prediction to said user based on a user-defined alert level.

11. The networked electromagnetic signal detector of claim 1, wherein said user interface communicates said prediction to said user via one of an audible output, a visual output and a mechanical output.

12. The networked electromagnetic signal detector of claim 1, wherein said prediction is based on a road segment.

13. The networked electromagnetic signal detector of claim 12, wherein said road segment is suggested for travel by a navigation application.

14. The networked electromagnetic signal detector of claim 1, wherein said prediction is based on at least one of a heading, a speed, an acceleration and a driving pattern associated with a motor vehicle that is using said electromagnetic signal detector.

15. The networked electromagnetic signal detector of claim 1, wherein said prediction is based on a weighted factor.

16. The networked electromagnetic signal detector of claim 1, wherein said weighted factor is based upon a time associated with said data.

17. The networked electromagnetic signal detector of claim 1, wherein said electromagnetic signal detector is operably associated with a navigation application.

18. The networked electromagnetic signal detector of claim 1, wherein said prediction of said alert level is communicated to said user as a probability.

19. The networked electromagnetic signal detector of claim 1, wherein said electromagnetic signal detector receives an instruction from said server to execute in a proximity mode.

20. The networked electromagnetic signal detector of claim 1, comprising:
   a storage element that stores said data; and
   a data processing element, wherein said data processing element calculates a second prediction of a second alert level based on said data stored in said storage element.

21. The networked electromagnetic signal detector of claim 1, wherein said detection of an electromagnetic signal by said electromagnetic signal detector is associated with a detection alert level; and said user interface further communicates to a user of said networked electromagnetic signal detector an output based upon said detection alert level.

22. The networked electromagnetic signal detector of claim 21, wherein said output communicates one of said detection alert level and a combined alert level based upon said detection alert level and said prediction.

23. The networked electromagnetic signal detector of claim 21, wherein said user interface communicates said prediction to said user via one of a first audible output, a first visual output and a first mechanical output; and wherein said output comprises one of a second audible output, a second visual output and a second mechanical output.

24. The networked electromagnetic signal detector of claim 1, wherein said analysis determines a statistical likelihood that said electromagnetic signal detector is in proximity to at least one of a school zone, a daycare, a hospital zone, and a location of law enforcement activity.

25. A server for at least one networked electromagnetic signal detector, comprising:
   a reception element that receives data based on detection monitoring by at least one electromagnetic signal detector;
   an analysis algorithm that analyzes said data, wherein analyzing said data generates a prediction of an alert level based on a geographic location associated with said at least one electromagnetic signal detector; and
   a transmission element that transmits said prediction to said at least one electromagnetic signal detector based on a geographic location associated with said at least one electromagnetic signal detector; wherein said at least one electromagnetic signal detector communicates said prediction to a user of said at least one electromagnetic signal detector.

26. The server for at least one networked electromagnetic signal detector of claim 25, wherein said transmission element transmits said prediction to said at least one electromagnetic signal detector by transmitting said prediction to a mobile communication device, wherein said mobile communication device transmits said prediction to said at least one electromagnetic signal detector.

27. The server for at least one networked electromagnetic signal detector of claim 25, wherein said data further comprises at least one of a traffic condition, a hazard, an alert, a school zone, a daycare, a hospital zone, a location of law enforcement activity, and a weather condition associated with said geographic location.

28. The server for at least one networked electromagnetic signal detector of claim 25, wherein said prediction is one of a prediction of whether a signal detected by said at least one electromagnetic signal detector is associated with an alert and a prediction of whether a location is associated with an alert.

29. The server for at least one networked electromagnetic signal detector of claim 25, wherein said server transmits said prediction to an other electromagnetic signal detector based on a geographic proximity between said other electromagnetic signal detector and said at least one electromagnetic signal detector; wherein said other electromagnetic signal detector communicates said prediction to a user of said other electromagnetic signal detector.

30. The server for at least one networked electromagnetic signal detector of claim 29, wherein said server transmits said prediction to said other electromagnetic signal detector in near real time.

31. The server for at least one networked electromagnetic signal detector of claim 25, wherein said server receives said data from said at least one electromagnetic signal detector and transmits data in near real time when said at least one electromagnetic signal detector is in a proximity mode.

32. The server for at least one networked electromagnetic signal detector of claim 31, wherein said server transmits an instruction to said at least one electromagnetic signal detector to execute in said proximity mode.

33. The server for at least one networked electromagnetic signal detector of claim 32, wherein said server transmits said instruction based upon a determination that a first networked electromagnetic signal detector and a second networked electromagnetic signal detector are within a functional proximity.

34. The server for at least one networked electromagnetic signal detector of claim 33, wherein said functional proximity is based upon at least one of a time, a volume of data associated with said geographic location, a speed associated with said electromagnetic signal detector, and a heading associated with said electromagnetic signal detector.

35. The server for at least one networked electromagnetic signal detector of claim 33, further comprising a second transmission element that transmits said prediction and said geographic location associated with said at least one electromagnetic signal detector to at least one of a private communication network and a public communication network.

36. The server for at least one networked electromagnetic signal detector of claim 33, wherein said analysis algorithm determines a statistical likelihood that said electromagnetic signal detector is in proximity to at least one of a school zone, a daycare, a hospital zone, and a location of law enforcement activity, wherein said prediction of said alert level is based upon said statistical likelihood.

37. A system for networked electromagnetic signal detectors, the system comprising:
an electromagnetic signal detector that:
a) transmits data based on one of a detection of an electromagnetic signal and a parameter; and
a server that:
b) receives data from a plurality of electromagnetic signal detectors, wherein said plurality of electromagnetic signal detectors comprises said electromagnetic signal detector,
c) analyzes said data, wherein analyzing said data generates a prediction of an alert level based on a geographic location associated with at least one of said plurality of electromagnetic signal detectors, and
d) transmits said prediction of said alert level to said electromagnetic signal detector, wherein said prediction of said alert level is based on a geographic location associated with said electromagnetic signal detector; wherein said electromagnetic signal detector communicates said prediction to a user of said electromagnetic signal detector.

38. The system for networked electromagnetic signal detectors of claim 37, wherein said parameter is at least one of a threshold quantity of data, a threshold data storage size, and a time schedule.

39. The system for networked electromagnetic signal detectors of claim 37, wherein said server transmits said prediction of said alert level to an other electromagnetic signal detector based on a geographic proximity between said other electromagnetic signal detector and said electromagnetic signal detector; wherein said other electromagnetic signal detector communicates said prediction of said alert level to a user of said other electromagnetic signal detector.

40. The system for networked electromagnetic signal detectors of claim 39, wherein said server transmits said prediction of said alert level to said other electromagnetic signal detector in near real time.

41. The system for networked electromagnetic signal detectors of claim 37, wherein said electromagnetic signal detector transmits data in near real time when said electromagnetic signal detector is in a proximity mode.

42. The system for networked electromagnetic signal detectors of claim 41, wherein said server transmits an instruction to said electromagnetic signal detector to execute in said proximity mode.

43. The system for networked electromagnetic signal detectors of claim 37, wherein said server further: generates said prediction of said alert level based on a geographic location associated with at least one mobile communication device; and transmits said prediction of said alert level to said mobile communication device, wherein said mobile communication device communicates said prediction to a user of said mobile communication device.

44. The system for networked electromagnetic signal detectors of claim 43, wherein said mobile communication device is at least one of a mobile phone, a smart phone, a satellite phone, a portable computer, a navigation system with wireless connectivity, and a citizens band radio.

45. The system for networked electromagnetic signal detectors of claim 37, wherein said server further comprises a database; wherein said database stores each said prediction of said alert level and may be transferred to an external device; wherein said external device communicates said prediction to a user of said external device.

46. The system for networked electromagnetic signal detectors of claim 45, wherein said external device is one of a mobile communication device and a device without wireless connectivity.

47. The system for networked electromagnetic signal detectors of claim 45, wherein said database in said external device is updatable using at least one of a public communication network, a private communication network, and a storage device.

48. The system for networked electromagnetic signal detectors of claim 37, wherein said electromagnetic signal detector transmits said data according to a packet protocol defined by said server.

49. The system for networked electromagnetic signal detectors of claim 48, wherein said packet protocol is updatable; said server provides an update based upon at least one of data quality, bandwidth usage, a received volume of said data, and system requirements; and said electromagnetic signal detector may download and implement said update.

50. The system for networked electromagnetic signal detectors of claim 49, wherein said update comprises at least one of a software update and a firmware update.

51. A method for networked electromagnetic signal detectors, the method comprising:
   a) detecting an electromagnetic signal;
   b) transmitting data based on detection of said electromagnetic signal;
   c) receiving data based on a plurality of detections by a plurality of electromagnetic signal detectors;
   d) analyzing said data, wherein analyzing said data generates a prediction of an alert level based on a geographic location associated with at least one of said plurality of electromagnetic signal detectors; and
   e) transmitting said prediction to a mobile communication device based on a geographic location associated with said mobile communication device; and
   f) communicating said prediction to a user of said mobile communication device.

52. The method of claim 51, wherein said mobile communication device is at least one of an electromagnetic signal detector and a mobile communication device subscribed to a prediction service, wherein said mobile communication device subscribed to said prediction service lacks radar and laser signal detection capabilities.

53. The method of claim 52, wherein said mobile communication device subscribed to said prediction service is at least one of a mobile phone, a smart phone, a satellite phone, a portable computer, a navigation system with wireless connectivity, and a citizens band radio.

54. The method of claim 52, wherein said analyzing determines a statistical likelihood that said mobile communication device is in proximity to at least one of a school zone, a daycare, a hospital zone, and a location of law enforcement activity, wherein said prediction of said alert level is based upon said statistical likelihood.

55. A computer program product for networked electromagnetic signal detectors, the computer program product comprising:
   a non-transitory computer readable storage medium storing computer executable program code that, when executed by a processor, causes performance of a method comprising:
   a) processing a detection of an electromagnetic signal;
   b) transmitting data based on detection of said electromagnetic signal;
   c) receiving data based on a plurality of detections by a plurality of electromagnetic signal detectors;
   d) analyzing said data, wherein analyzing said data generates a prediction of an alert level based on a geographic location associated with at least two of said plurality of electromagnetic signal detectors; and
   e) transmitting said prediction to an electromagnetic signal detector based on a geographic location associated with said electromagnetic signal detector; and
   f) communicating said prediction to a user of said electromagnetic signal detector.

56. A networked electromagnetic signal detector, comprising:
   an electromagnetic signal detector;
   a transmission element that transmits data based on a detection of an electromagnetic signal by said electromagnetic signal detector to a server;
   a reception element that receives a prediction of an alert level from said server, wherein said prediction is based on an analysis of data aggregated from at least one networked electromagnetic signal detector; and
   a user interface to communicate said prediction to a user of said networked electromagnetic signal detector.

57. The networked electromagnetic signal detector of claim 56, wherein said prediction is further based upon a parameter associated with said networked electromagnetic signal detector, wherein said parameter is at least one of a geographic location, a speed, a heading, route, a timestamp, a time interval, and an acceleration associated with a motor vehicle that is using said electromagnetic signal detector.

58. A networked device, comprising:
   a reception element that receives a prediction of an alert level associated with a geographic location from a server associated with a system of networked electromagnetic signal detectors, wherein said system, comprises at least one networked electromagnetic signal detector that transmits data based on one of a detection of an electromagnetic signal and a geographic location associated with said networked electromagnetic signal detector; and said server that receives said data, and analyzes said data, wherein analyzing said data generates said prediction of said alert level associated with said geographic location; and
   a user interface to communicate an alert to a user of said networked device based upon said prediction of said alert level associated with said geographic location and a geographic location associated with said networked device.

59. The networked device of claim 58, further comprising a storage element that stores a database, wherein said database comprises at least one said prediction of said alert level associated with said geographic location.

* * * * *